(12) United States Patent
Braswell

(10) Patent No.: US 9,757,954 B2
(45) Date of Patent: Sep. 12, 2017

(54) PSEUDO-METALLIC INKJET PRINTING

(71) Applicant: Total System Services, Inc., Columbus, GA (US)

(72) Inventor: Fred Braswell, Pine Mountain, GA (US)

(73) Assignee: Total System Services, Inc., Columbus, GA (US)

( * ) Notice: Subject to any disclaimer, the term of this patent is extended or adjusted under 35 U.S.C. 154(b) by 0 days.

(21) Appl. No.: 14/456,097

(22) Filed: Aug. 11, 2014

(65) Prior Publication Data

US 2015/0062268 A1     Mar. 5, 2015

Related U.S. Application Data

(60) Provisional application No. 61/873,593, filed on Sep. 4, 2013.

(51) Int. Cl.
| | | |
|---|---|---|
| *B41J 2/21* | (2006.01) |
| *B41M 5/00* | (2006.01) |
| *B41M 7/00* | (2006.01) |
| *B42D 25/00* | (2014.01) |
| *B32B 27/08* | (2006.01) |

(52) U.S. Cl.
CPC ............. *B41J 2/2132* (2013.01); *B32B 27/08* (2013.01); *B41M 5/0047* (2013.01); *B41M 5/0064* (2013.01); *B41M 7/0081* (2013.01); *B42D 25/00* (2014.10); *B32B 2255/10* (2013.01); *B32B 2255/205* (2013.01); *B32B 2307/4023* (2013.01); *B32B 2307/412* (2013.01); *B32B 2307/414* (2013.01); *B32B 2425/00* (2013.01); *B42D 2033/20* (2013.01); *B42D 2033/30* (2013.01); *B42D 2035/24* (2013.01)

(58) Field of Classification Search
CPC .. B41J 2/2132; B41M 5/0047; B41M 5/0064; B41M 7/0081; B41M 7/0027; B41M 7/0018; B42D 2033/20; B42D 2033/30; B42D 2035/24; B42D 25/00; B32B 2255/10; B32B 2255/205; B32B 2307/4023; B32B 2307/412; C23C 26/00
See application file for complete search history.

(56) References Cited

U.S. PATENT DOCUMENTS

| | | | | |
|---|---|---|---|---|
| 6,543,890 B1* | 4/2003 | Ylitalo | ................... | B41J 11/002 347/102 |
| 6,837,959 B2* | 1/2005 | Daems | ................... | B42D 25/00 156/269 |
| 7,763,179 B2* | 7/2010 | Levy | ................ | B41M 5/24 216/94 |
| 7,770,801 B1* | 8/2010 | Bailey | ................ | B32B 7/12 235/487 |
| 2002/0105183 A1* | 8/2002 | Holt | ................ | G07F 7/086 283/81 |
| 2003/0211296 A1* | 11/2003 | Jones | ................. | B32B 38/145 428/195.1 |

(Continued)

*Primary Examiner* — Sonya Mazumdar
(74) *Attorney, Agent, or Firm* — Jacob Neu; Bradley Arant Boult Cummings, LLP

(57) ABSTRACT

A process for using an inkjet printer to apply translucent inks for producing a pseudo-metallic visual effect on a substrate is disclosed. The process uses a matte printing technique that results in a metallic appearance when applied to various substrates, such as commercial plastic cards. The resulting card product is also disclosed.

10 Claims, 3 Drawing Sheets

(56) References Cited

U.S. PATENT DOCUMENTS

| | | | |
|---|---|---|---|
| 2004/0066441 A1* | 4/2004 | Jones | B41J 3/60 |
| | | | 347/101 |
| 2005/0247794 A1* | 11/2005 | Jones | B42D 25/313 |
| | | | 235/487 |
| 2005/0258637 A1* | 11/2005 | Bi | B42D 25/29 |
| | | | 283/91 |
| 2006/0073312 A1* | 4/2006 | Hattori | B32B 27/36 |
| | | | 428/195.1 |
| 2006/0138243 A1* | 6/2006 | Bi | G06K 19/06046 |
| | | | 235/487 |
| 2008/0136160 A1* | 6/2008 | Leenders | B41M 5/0029 |
| | | | 283/72 |
| 2009/0315321 A1* | 12/2009 | Michieli | B32B 37/02 |
| | | | 283/111 |
| 2010/0276495 A1* | 11/2010 | Goldstein | B29C 44/1228 |
| | | | 235/488 |
| 2011/0033675 A1* | 2/2011 | Jones | B42D 25/29 |
| | | | 428/199 |

* cited by examiner

PSEUDO-METALLIC INKJET PRINTING

CROSS-REFERENCE TO RELATED APPLICATIONS

This application claims the benefit of filing of U.S. Provisional Application No. 61/873,593, filed on Sep. 4, 2013.

FIELD OF THE INVENTION

The invention relates generally to printing methods, and more particularly to creating a pseudo-metallic ink print using an inkjet printer.

BACKGROUND

Commercial and industrial printing relies on a number of different printing methods for various purposes. Screen printing (or silkscreen printing) is a well-known method of printing wherein transfer inks or dyes are passed through a mesh stencil onto the substrate that is being printed on. The mesh stencil is formed to apply a single color over a single design area. After applying the stencil to the substrate, the colored ink is forced through the stencil, such as by a roller or squeegee passing over the stencil, onto the substrate. By applying different mesh stencils with different colors, a multicolored image can be printed onto the substrate. Screen printing provides a sharply defined edge for each color during the printing process.

Moreover, a wide variety of inks and dyes can be used in conjunction with screen printing. The most common inks today are plastisol inks, but specialty inks that provide different texture, vibrancy, or adherence to a substrate may be used for particular purposes. One such ink is metallic ink, which includes tiny metal particles suspended in the ink. The metallic particles provide a shimmery or effervescent appearance to the ink. Metallic inks are common in a variety of contexts and applications to provide such a metallic gleam. One such application is in the credit card industry, where metallic inks are printed on the plastic credit card substrate to provide a high-end look and feel that is valued by both banks and credit card users.

While screen printing provides high-quality images with a wide variety of ink colors and types, it also tends to be slower and more expensive than other common printing techniques. This is because screen printing requires a different mesh screen for each colored ink being applied to a printed substrate if the end product is to be multicolored. Moreover, the inks can only be applied one at a time. While it is well-known that the combination of only a few colors can result in a wide variety of colors, hues, and luminescence, such models require at least 4 colors to achieve any desired hue. (One commonly used color model of this type is cyan, magenta, yellow, and black (also known as "key"), and generally referred to as "CMYK." This color model will be referred to in the description below, but the CMYK model can be converted into any number of other well-known color models, as known by a person of ordinary skill.) Therefore, in order to achieve truly multicolored images, a screen print must be repeated at least 4 times to achieve the desired colors. This results in a slower and more expensive process. For this reason, screen printing is typically only used for embellishments, such as metallic or pearl printing, while the basic 4-color models are applied using lithographic printing methods. However, because the wire mesh screens are static and must be changed out for any variation to be made when printing several cards, the screen printing process remains inefficient and time consuming. Additionally, for small-quantity runs, screen printing is very costly on a per-item basis. Accordingly, it is difficult to prepare custom images desired by consumers.

Other commercial and industrial printers address these perceived disadvantages with screen printing. Another type of commonly used printing is inkjet printing. In an inkjet printer, ink is forced through a microscopic nozzle in a "jet" or stream of ink. By forcing a microscopically thin jet of ink out the nozzle, the single stream of ink breaks into multiple small droplets of roughly the same size, the effect of a natural phenomenon known as Plateau-Rayleigh instability whereby fluids in streams break into smaller discrete units due to the surface tension of the fluid. Once the ink separates into microscopic droplets, the droplets may be directed onto the substrate to form an image.

While inkjet printers have a number of different methods of applying ink, one typical application process known as piezoelectric drop-on-demand printing is common in industrial-scale inkjet printing. In this method of printing, the inkjet nozzles release the individual colored inks only at specified locations as instructed by the computer printing software. (Hence, the colored ink is "dropped on demand," rather than applied in a continuous stream.) The ink droplets are controlled by the flexing of a piezoelectric crystal in response to an electric field applied to the crystal. This allows very detailed and accurate control of the amount of ink dispensed in a particular droplet. Another form of drop on demand printing is thermal printing, whereby the nozzle is heated to expand to volume of the ink, thereby forcing ink out of the nozzle head.

When the ink contacts the substrate, it may be "pinned," such that the ink solidifies, ceases flowing and is cured by UV rays. Additional drops of ink, which may either be the same or different colors, are added to the same spot on the substrate to create the desired color and hue. These are pinned and cured by UV rays in the same manner.

Because the inks can be applied simultaneously, inkjet printing can be significantly faster than screen printing techniques, and performed much more cheaply as well. However, inkjet printing also has particular disadvantages. One disadvantage is that not all inks can be applied, or applied as well, in inkjet printing. For example, metallic inks either clog the inkjet, or produce inferior improper images. In particular, the size of a metallic particle or flake that is necessary to produce the "sparkle" of the ink is too large to travel through an inkjet nozzle. Therefore, current metallic inks have much smaller flakes, and the resulting image takes on the appearance of a solid foil, rather than the desired sparkle. These images are also much slower to produce, and metallic inks for industrial inkjet printers are more expensive. Therefore, the use of metallic inks in inkjet printing presents too many obstacles to be a preferred and commonly used method in the mass production of credit cards.

If inkjet printing can achieve a metallic look and feel to an image without relying on metallic inks, inkjet printing could replace screen printing to achieve images of a similar look and quality, and do so more quickly and cheaply. What is needed, is a process for applying nonmetallic inkjet inks in a manner that mimics the look of a metallic ink applied in screen printing.

SUMMARY OF THE INVENTION

In some respects, an embodiment of a process disclosed herein is for printing nonmetallic inks using an inkjet printing method to achieve a metallic look and feel.

In other respects, the process is applied to substrates of particular qualities and characteristics, which enhance the metallic look and feel of the applied inks.

In other aspects, the embodiments relate to a process for creating a pseudo-metallic ink print using an inkjet printer, having the steps of applying to a first side of a first substrate an array of ink dots; curing the translucent ink droplets substantially instantaneously upon contact with the substrate; applying to a first side of a second substrate an opaque grayscale ink; curing the grayscale ink; and laminating the first substrate to the second substrate, wherein the first side of the first substrate contacts the second side of the second substrate.

In other aspects, the embodiments relate to a process for creating a pseudo-metallic ink print on an inkjet printer, having the steps of applying to a first side of a substrate an opaque ink; curing the ink; applying to the first side of the substrate a mix of translucent ink droplets, where the ink droplets are arranged in a randomized size and location distribution density; curing the translucent ink droplets substantially instantaneously upon contact with the substrate; and laminating to the first side of the substrate a clear laminate.

In other aspects, the embodiments relate to a process for making a payment card using an inkjet printer having the steps of applying to a first side of a first clear laminate substrate an array of ink dots of a randomized size and location distribution density; applying to a first side of a second clear laminate a mix of translucent ink droplets comprising a randomized size and location distribution density; curing the translucent ink droplets substantially instantaneously upon contact with the substrate; applying to each sides of a plastic card an opaque grayscale ink; curing the grayscale ink; laminating the first laminate to the plastic card, where the first side of the first laminate contacts the card; and laminating the second laminate to the plastic card, where the first side of the second laminate contacts the card.

In other aspects, the embodiments relate to a method of applying translucent ink droplets to a substrate to give the appearance of a metallic ink, the method having the steps of applying a grayscale backing layer to the substrate; stochastically applying a mix of translucent ink droplets to the backing layer; curing the mix of translucent inks substantially immediately upon contact with the backing layer; and applying a clear laminate to the backing layer.

In other aspects, the embodiments relate to a payment card having a mix of translucent inks applied to give the appearance of a metallic ink, the card having a plastic card layer, having an opaque grayscale ink cured on a first side; a clear plastic layer laminated to the first side of the plastic card layer; and a mix of translucent ink droplets cured substantially immediately upon contact with the substrate and stochastically arranged between the clear plastic layer and the first side of the plastic card layer.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
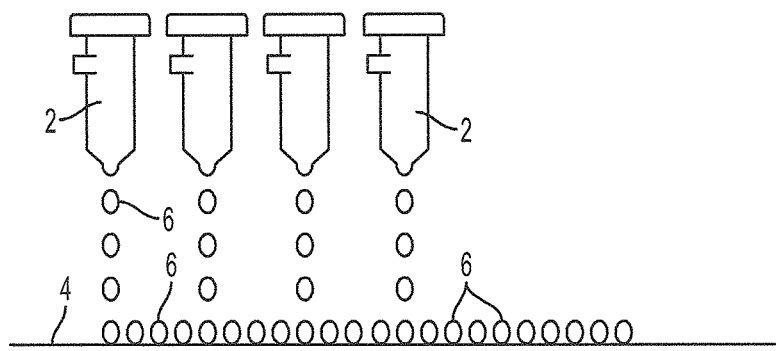
FIG. 1 shows a set of ink jet printer cartridges releasing droplets of ink onto a substrate.

FIG. 1 depicts a typical inkjet printhead setup for industrial production. An array of inkjet nozzles 2 containing inks of various colors are aligned over a printing area. While the inkjet nozzles 2 can contain inks of any desired color, it is well known that the use of particular sets of four colors can be combined in varying amounts to produce an immense range of colors visible to the human eye. The most commonly used color model includes cyan, magenta, yellow, and key (or black), known as the CMYK color model. These inks, combined in various concentrations, can produce thousands of colors. For purposes of increased printing clarity, inkjet nozzles 2 and reservoirs of cyan, magenta, and key having greater luminescence (i.e., a lighter tone) may also be included. Unless specifically sold as opaque inks, the inks 8 in the CMYK model, including the light versions, are translucent such that light penetrates the ink and is filtered to appear as a particular color. Lastly, industrial production printers also use an opaque white ink 12 for detailing and opaque imaging or printing.

Although CMYK is a typical 4-color model for printing colors, a 3-dimensional "color space" is typically used to describe a particular color. One typical color space is a Lab color space, wherein the L coordinate describes the lightness of luminescence of the color, and a and b are color-opponent dimensions plotted in an x-y Cartesian plane. For example, the "a" coordinate may describe a color on the yellow-blue spectrum in the x direction, and the "b" coordinate may describe the color on the red-green spectrum in the y direction. The colors described here will be provided in CIELAB coordinates, which is a commonly used color space established by the International Commission on Illumination.

To print an image, a substrate 4 for printing is passed underneath the array of inkjet nozzles 2. The substrate 4 is any material that can have ink applied to it for printing. Common substrates include, without limitation, paper, transparent plastics, opaque plastics, cardboard, textiles, metals, and wood. Alternatively, the array of ink nozzles 2 may be moved above the substrate 4, which may remain stationary during the printing process.

The nozzle function described below is with reference to a piezoelectric drop-on-demand inkjet nozzle 2. However, the same principles may be applied to other forms of inket printing, such as continuous stream printing and thermal drop on demand printing. The nature of the ink-dispensing technology in the nozzle 2 is well known and the application of the processes and products disclosed herein may be used with any particular form of inkjet printing technology, but an exemplary technology is discussed below to describe the basic process.

As the nozzles 2 pass over the substrate 4, a print software file loaded into the printer memory and computer processing unit directs which nozzles 2 are to dispense ink to form the desired image. When using a piezoelectric drop on demand printer, the print software file instructs the application of electricity to the piezoelectric element (typically a diaphragm or other flexing element) in a particular nozzle at the appropriate time, causing the element to flex for a given amount of time and force ink out of the nozzle. In industrial production printers, the nozzle head is very small, such that the volume of ink dispensed is on the order of 2-40 picoliters depending on the nozzle construction and the concentration of dots applicable by the printer (measured in dots per inch, or dpi).

As the ink is dispensed from the nozzle, the stream separates into multiple droplets 6. The droplets 6 may have varying sizes and target to various locations within the dot. For example, the dispensing action may have 2 or more droplet sizes applied to the "center" of the dot, with smaller droplets 6 of multiple sizes used in the "satellite" or "periphery" of the dot. In one embodiment, there are 2 primary droplet sizes and 3 satellite droplet sizes. The droplets 6 contact the substrate 4 and are "pinned" to the surface of the substrate 4, typically by a UV-curing mechanism. A UV lamp applies UV light at a specified frequency that causes the liquid ink to polymerize and cure upon application of the light.

Figure 2:
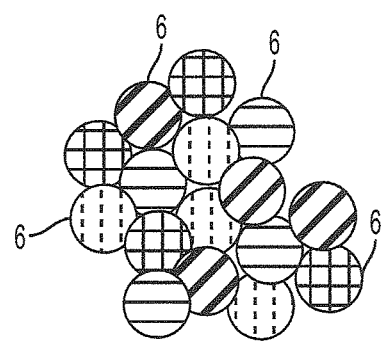
FIG. 2 shows a close-up image of a single dot having multiple droplets of variously colored inks.

As shown in FIG. 2, one or more ink droplets 6 of various colors may applied to a particular "dot" location on the paper. For example, to achieve a dark-hued blue, multiple cyan and magenta droplets 6 are located at a single "dot." Other color combinations are possible through the combination of other varying amounts of ink. Because the inks are translucent, light refracts through the inks and reflects back to the viewer's eye as displaying the color filtered by the combination of ink droplets 6.

The timing of the UV cure of the inks can also affect the gloss of the image. Gloss is a measure of shine reflected from a surface, based on the amount of light that is reflected from a surface in an equal and opposite direction to the light striking the surface (known as specular reflection). If a high percentage of light is specularly reflected from the surface, the surface has a high gloss and a shiny appearance. On the other hand, if light reflects in a scattered manner (known as diffuse reflection), the surface appears flat or unreflective.

The timing of UV cure of the inks affects the gloss of the image by manipulating the reflective surface of the ink droplets 6 when they are cured on the substrate 4. When an ink droplet 6 is falling towards the substrate 4, its profile is that of an elongated, dart-like shape. Upon contact with the substrate 4, the ink droplet 6 wets the surface (thereby adhering to it) and begins to spread horizontally across the surface of the substrate 4. When cured by the UV lamp, the ink polymerizes and ceases flowing.

Figure 3:
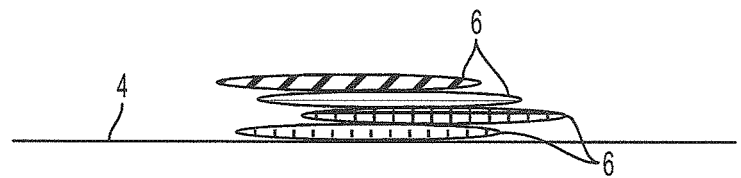
FIG. 3 shows a cross-sectional view of ink droplets spread out to form a glossy dot.

As depicted in FIG. 3, in a high gloss image, the ink droplets 6 forming a single dot on the substrate 4 are cured in a substantially flat configuration. They may overlap each other, as depicted here, or be somewhat mixed together, depending on the timing of the ink droplets 6 being dispensed and the cure of the UV rays. Regardless, the microscopic surface topography of the dot is substantially flat, which increases the amount of specular reflection and results in a high-gloss image.

Figure 4:
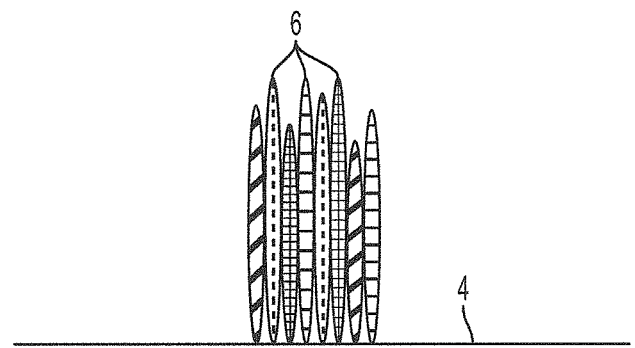
FIG. 4 shows a cross-section view of ink droplets pinned and cured while just touching the substrate, forming a matte dot.

In contrast, as depicted in FIG. 4, the ink droplets 6 may be cured and pinned almost immediately upon contact with the substrate 4. The cured ink hardens while still in a substantially elongated, dart-like shape, together with other ink droplets 6 forming the dot in the printing process. Accordingly, light waves do not encounter a smooth flat surface or layer of inks, but rather an uneven layer of inks having a number of "peaks" and "valleys" between the ink. This results in light waves refracting and reflecting at multiple different angles, sometimes undergoing multiple refractions and reflections by passing through multiple ink droplets 6, and creating a "diffuse" reflection (as opposed to specular reflection). This creates a flat glossless (or matte) appearance, as opposed to a glossy appearance.

It has been found that the use of matte inkjet printing, combined with other choices relating to the substrate 4 and lamination, can result in an illusory appearance of the use of metallic ink, when in fact no metallic ink is used. This application is particularly useful in card printing, where the substrate 4 is a plastic base which may have a wide variety of appearances.

Figure 5:
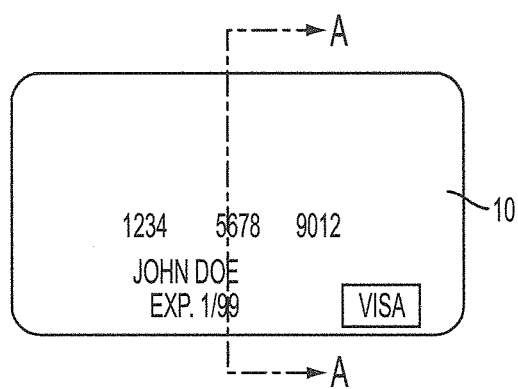
FIG. 5 shows a typical commercial card, in accordance with one embodiment of the disclosure.

This pseudo-metallic inkjet printing process, and the card produced by the process, have particular relevance for credit cards, debit cards, charge cards, membership cards, and other types of plastic, wallet-sized cards. This is because, first, metallic inks are preferred for providing a high-quality "look and feel" to cards used in financial transactions. The use of a gold or silver ink having metallic particles provides a sense of value to the card. Additionally, consumers tend to be drawn to cards having distinctive visual effects and typically choose more embellished cards, such as those having a metallic appearance. A typical commercial card 10 is shown in FIG. 5.

Figure 6:
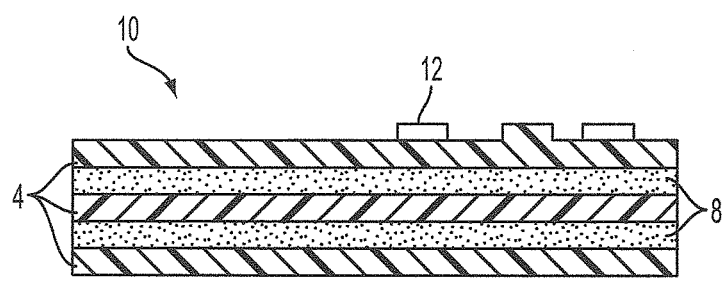
FIG. 6 shows a cross section of the card shown in FIG. 5 along the A-A line therein.

FIG. 6 depicts a cross-section of a typical commercial card 10. Such cards generally have three plastic substrates 4 (also called overlays). These substrates 4 or overlays are 0.002 to 0.003 inches in thickness and laminated together, with inks 8 sandwiched between each of the substrates 4. FIG. 6 shows a middle substrate 4 with a top substrate 4 laminated above it and a bottom substrate 4 laminated below it. However, it is not necessary for purposes of the pseudo-metallic printing process that either laminate be applied, so long as the inks are applied to a single surface or substrate 4.

Figure 7:
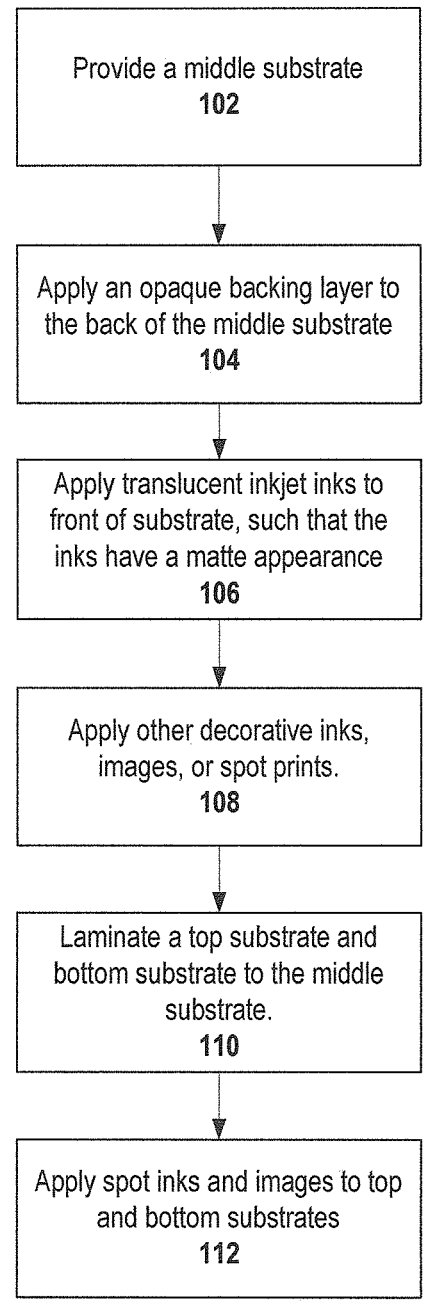
FIG. 7 shows a flow chart describing a process in accordance with one embodiment of this disclosure.

To achieve a pseudo-metallic look, the following process depicted in FIG. 7 is applied. First, the middle substrate is provided 102. It is preferred, although not required, that the middle substrate 4 be a clear plastic. It has been found that the use of a clear plastic, as opposed to an opaque plastic, enhances the luminescence of the card. However, the substrate 4 may in fact be opaque, or have a white opaque ink applied 104 to the entirety of the plastic before inks are applied, without departing from the scope of this disclosure. Moreover, where printing and artwork is to be applied to both sides of a card, it is typical for at least one side of the card to have an opaque base layer, so that the entire card is not translucent. This way, the printing on the "back" side of the card does not show when viewing the "front" side of the card, and vice versa. Because the front side of the card is typically the side that is viewed more often and where a metallic look and feel are more desired, it is preferred that the opaque ink layer be applied to the side of the substrate 4 that will become the "back" of the card. In this way, the advantageous effects of the clear substrate 4 may be used in conjunction with the "front" side.

Next, the color inks (also known as "spot inks") are applied 106 to the substrate 4. The inks are applied in particular combinations to achieve the desired colors when viewed. For example, to achieve a golden color, a CIELAB color having color coordinates are L=67, a=5, and b=41 are used. A silvery color may be applied where the color coordinates L=80, a=1, and b=1. As gold and silver tones are typical of most metallic colors, colors having a color coordinate equal to or near these metallic colors in the color space are preferred. However, the pseudo-metallic effect can be achieved with any desired color.

To apply the images to the card, one or more printers are used. It has been found that for commercial cards a 600 dpi, binary print setting is best for the metallic images on the card, while a 1000 dpi, grayscale setting provides the best imaging for non-metallic components. However, these settings are for purposes of color application and resolution, and other print settings may be applied as well without departing from the scope of this disclosure.

To apply the pseudo-metallic look, the printer should be set to a matte setting or printing mode, in order to achieve near-instantaneous pinning and curing of the ink droplets 6. Individual printers may call this a flat, glossless, or some other setting, so long as the setting is such that the UV-cured inks are pinned and cured nearly instantaneously upon contact with the substrate 4. Such a mode is referred to as a matte printing mode for simplicity herein. Additionally the shutter options for the UV pinning lamp should be set to set to 100% intensity to achieve the quickest cure rate, with the lamp shutter options set to "leading" and "trailing." "Leading" or "leading edge" curing occurs when the lamp light is applied at the front of the carriage. In this mode, the cure does not typically occur until the printing carriage returns over the location, and typically leads to a flatter topography of the cured ink. Conversely, "trailing" or "trailing edge" curing occurs when the lamp is applied behind the carriage, so that the ink cures much sooner after being applied and takes on a more uneven topography. It has been found that when the UV lamp is applied on both the leading and the trailing edge, the inks cure in a more random fashion, which contributes to the "sparkling" look and feel similar to a metallic ink. By applying these printer settings, the printer is ready to print with a pseudo-metallic appearance.

Printing now proceeds. The colors are applied as desired by the printers. A print file contains the software instructions directing the ink jet printers to apply ink of the various colors at the appropriate times. Ink is applied to both the front and the back of the middle substrate 4 as desired. This typically requires two runs through the printer, one for each side. Once the inks are applied, other artwork may be applied 108 on top of the base layers. This is usually done by applying a white opaque backing layer at the particular locations where additional artwork is being applied. Once the white opaque ink layer is applied, the artwork is applied over the white ink layer. (For example, in a typical credit card, a MASTERCARD® or VISA® logo, appears on the bottom right of the front side of the card. To print the image, first a white opaque ink applied where the logo will appear, and then the logo is printed over the white ink.) The use of the white ink layer makes the artwork opaque vis-à-vis the translucent inks applied below it. However, this is not necessary if in effect a translucent or transparent look is desired.

Additional spot printing, such as the use of white opaque ink 12 for lettering and numbering on the card, may also be applied at this time.

Once the middle substrate 4 has been printed and prepared, the top substrate 4 and the bottom substrate 4 are laminated 110 to the front and back of the middle substrate 4, respectively. For commercial cards, the bottom substrate 4 has a coded magnetic stripe. The bottom substrate 4 is applied to the middle substrate 4 with the magnetic stripe facing outward. The lamination occurs by applying heat and pressure to join the substrates 4 together. Finally, a last round of printing, such as the application of the magnetic strip and any other applications of white opaque ink, are applied 112 to the card.

The advantages of this systems, processes, and products described above are numerous. First, it allows inkjet printing to be used with card manufacturing to apply a pseudo-metallic appearance. Inkjet printing allows for a faster and cheaper printing process for commercial cards over the current practice of screen printing. Second, inkjet printing allows different images to be used for printing multiple cards on a single sheet. (For example, cards may be printed on an 8×8 sheet of 64 cards, which are then cut apart into single cards). This allows for highly personalized printed images, since new wire mesh screens are not required for each individual image. This particular efficiency was not possible when cards were limited to screen printing technology. Similarly, multiple-color metallic images can be printed, rather than just one color as typically done in screen printing to forego having to make multiple screen meshes for each card. Also similarly, whereas it currently takes several weeks and significant storage space to print individual data on each card (e.g., the card or account number, the name of the account holder, expiration date, and other individualized card information), the use of inkjet printing will allow such individual or unique information to be included during the printing process. Another point of efficiency is that if an opaque substrate 4 is desired, a clear substrate 4 may be used initially, and the first layer would be the white opaque ink.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A process for creating a pseudo-metallic ink print using an inkjet printer, comprising:
   a. applying to a first side of a first substrate an array of translucent ink dots deposited from an inkjet printer printhead;
   b. curing, by a UV ink curing lamp, the translucent ink dots substantially instantaneously upon contact with the substrate, such that the ink dots cure in a substantially vertically elongated shape;
   c. applying to a first side of a second substrate an opaque grayscale ink;
   d. curing the grayscale ink; and
   e. laminating the first substrate to the second substrate, wherein the first side of the first substrate contacts the second side of the second substrate.

2. The process of claim 1, where the first substrate is a transparent substrate.

3. The process of claim 1, where the array of ink dots are arranged in an image and applied in a pseudo-randomized size and location distribution density.

4. The process of claim 1, where the mix of translucent ink dots approximates a golden metallic color.

5. The process of claim 1, where the translucent ink dots are applied in 600 dots per inch binary resolution.

6. The process of claim 1, where the printer is set to a matte printing mode.

7. The process of claim 1, where the ink curing lamp is activated for both the leading and trailing edge of the printhead.

8. A process for making a payment card using an inkjet printer comprising:

a. applying to a first side of a first clear laminate an array of ink dots of a randomized size and location distribution density;
b. applying to a first side of a second clear laminate a mix of translucent ink dots comprising a randomized size and location distribution density, the ink dots being deposited from an inkjet printer printhead;
c. curing the translucent ink dots substantially instantaneously upon contact with the laminate, such that the ink dots cure in a substantially vertically elongated shape;
d. applying to each side of a plastic card an opaque grayscale ink;
e. curing the grayscale ink;
f. laminating the first laminate to the plastic card, where the first side of the first laminate contacts the card; and
g. laminating the second laminate to the plastic card, where the first side of the second laminate contacts the card.

9. The process of claim 8, where the printer is set to a matte printing mode.

10. The process of claim 8, where the ink curing lamp is activated for both the leading and trailing edge of the printhead.

\* \* \* \* \*